United States Patent [19]

Sparwald

[11] 4,006,066
[45] Feb. 1, 1977

[54] METHOD OF AND APPARATUS FOR THE TREATMENT OF EXHAUST-GASES IN THE ELECTROLYTIC PRODUCTION OF ALUMINUM

[75] Inventor: Volker Sparwald, Grevenbroich, Germany

[73] Assignees: Vereinigte Aluminum-Werke Aktiengesellschaft, Bonn; Metallgesellschaft Aktiengesellschaft, Frankfurt, both of Germany; part interest to each

[22] Filed: Jan. 22, 1975

[21] Appl. No.: 542,931

[30] Foreign Application Priority Data

Jan. 24, 1974 Germany .......................... 2403282

[52] U.S. Cl. ........................................ 204/67; 55/6; 55/11; 55/71; 55/79; 55/124; 55/135; 23/262; 204/247; 423/284

[51] Int. Cl.² ............................................. C25C 3/06

[58] Field of Search ............... 55/6, 11, 71, 8, 10, 55/77, 79, 122, 124–126, 390, 135, 479; 23/262; 204/67, 247; 423/240, 241, 483, 495, 484

[56] References Cited

UNITED STATES PATENTS

| 1,329,825 | 2/1920 | Bradley | 55/122 |
|---|---|---|---|
| 1,329,859 | 2/1920 | Schmidt et al. | 55/10 |
| 2,681,121 | 6/1954 | Richardson | 55/8 |
| 3,485,014 | 12/1969 | Atsukawa et al. | 55/79 |
| 3,503,184 | 3/1970 | Knapp et al. | 55/71 |
| 3,760,565 | 9/1973 | Fish | 55/71 |
| 3,780,497 | 12/1973 | Muhlrad | 55/71 |
| 3,827,955 | 8/1974 | Bahri | 55/71 |
| 3,907,971 | 9/1975 | Bohm et al. | 423/240 |

*Primary Examiner*—Bernard Nozick
*Attorney, Agent, or Firm*—Karl F. Ross; Herbert Dubno

[57] ABSTRACT

Hydrogen-fluoride-containing gases from the electrolytic production of aluminum are subjected to electrostatic precipitation to remove dust particles containing substances which are deleterious to aluminum production before the gases are treated in an expanded bed with alumina on which the hydrogen fluoride is adsorbed. Following the dry adsorption in the expanded bed, the gases entraining the adsorbent particles are subjected to electrostatic precipitation in which the particles are separated from the gas thus freed from hydrogen fluoride. The particles are recycled to the electrolytic aluminum production apparatus, the particles being free from the deleterious substances which have previously been removed.

8 Claims, 1 Drawing Figure

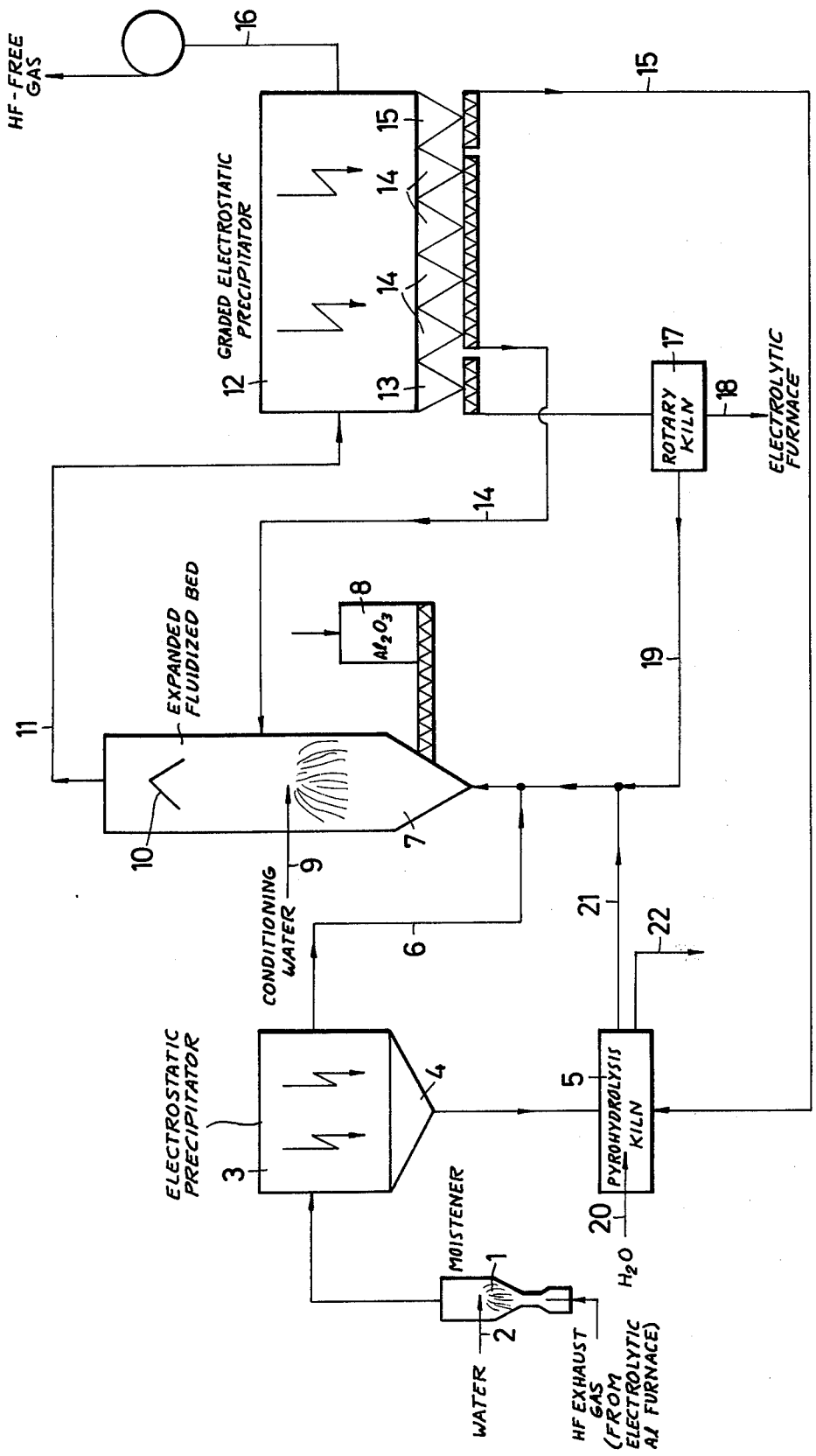

METHOD OF AND APPARATUS FOR THE TREATMENT OF EXHAUST-GASES IN THE ELECTROLYTIC PRODUCTION OF ALUMINUM

CROSS-REFERENCE TO RELATED APPLICATIONS

The present application is related to commonly assigned copending application Ser. No. 198,768 filed Nov. 15, 1971 now U.S. Pat. No. 3,907,971 and to commonly assigned copending application Ser. No. 488,930 filed July 16, 1974, now abandoned.

FIELD OF THE INVENTION

My present invention relates to the removal of hydrogen fluoride from waste gases of a plant for the electrolytic production of aluminum, to the discharge of waste gases of such plants free from the toxic and noxious hydrogen fluoride originally contained therein, to the electrolytic production of aluminum in which hydrogen fluoride released from the cryolite is recycled to the electrolytic bath, and to systems of the aforementioned type in which recycled hydrogen fluoride is used but the concentration of deleterious substances in the bath is avoided.

BACKGROUND OF THE INVENTION

Application Ser. No. 198,768 now U.S. Pat. No. 3,907,971 3907,971 describes a process for the removal of hydrogen fluoride from a gas stream containing same to the extent that the gases released into the atmosphere can have a significantly lower HF concentration than results from prior systems for the removal of HF from gas streams. The gas stream may be generated as an exhaust gas in the electrolytic production of aluminum.

The improvement described in application Ser. No. 198,768 is based upon the surprising discovery that the efficiency of removal of HF from a gas stream containing same can be substantially increased to a qualitative extent when the contact between the gas phase and the solid phase is carried out in an expanded fluidized bed, i.e., a fluidized bed in which a substantially uniform gradient of solids concentration or density (number of particles per unit volume or solids weight per unit volume) is maintained between the floor of the fluidized bed and the gas outlet therefrom, preferably throughout the height of the chamber, such that no sharp demarcation exists between the fluidized bed layer and any free space above this bed. The gas flow is such that the major proportion of the solids removed from the expanded fluidized bed is entrained by the gases and is separated therefrom, according to this application, by centrifugal action and sedimentation. The adsorbent particles are constituted of alumina which picks up the hydrogen fluoride and recycles it to the bed and to the furnace. The system described in the earliest application mentioned above uses primarily cyclone separation of the particulate matter entrained from the bed by the gases which can be released into the atmosphere substantially free from hydrogen fluoride.

In the subsequent application Ser. No. 488,930, there is described an improvement in which the particles are removed from the gas stream effluent from the expanded bed directly by electrostatic precipitation, it being indeed surprising that the preliminary mechanical separation by cyclones or the like can be eliminated. Surprisingly, the electrostatic precipitator is not overloaded by this action.

In general, the earlier systems deal with processes for the separation of hydrogen fluoride from exhaust gases formed in the production of aluminum by electrolytic techniques, i.e., the exhaust gases from an electrolytic production of aluminum by the dry adsorption of the HF upon alumina in a fluidized-bed reactor into which the gas is introduced as the fluidizing medium in such velocity as to produce a highly expanded fluidized bed as thus defined. That is, the solids concentration decreases from the bottom to the top uniformly over the entire height of the chamber as measured from the bottom to the outlet at the top of the chamber. The major part of the solids is discharged upwardly in entrainment with the gases and the solids are separated in an electrostatic precipitator directly following the fluidized bed in the improved version previously described. By "directly" following the fluidized bed it is meant that there is no intermediate separation of particles from the gas between the outlet of the expanded fluidized bed and the electrostatic precipitator.

However, the system described above has been found to have some problems, particularly since the gases effluent from the electrolytic-aluminum furnace, contain deleterious substances which will be described in greater detail below but which are taken up by the adsorbent and are recycled to the furnace with the latter so that the concentration of these deleterious substances tends to increase in the electrolytic furnace. Of course, where the alumina is not first used as an adsorbent but is charged directly into the furnace, the problem does not arise. Hence, while the systems described above were successful in purifying the air released into the atmosphere, they caused an additional difficulty with respect to return of deleterious substances to the electrolytic aluminum bath. The present system is directed to the avoidance of this problem.

In more general terms, it may be noted that various processes for recovering contaminants from a gas stream have been provided heretofore, whether because it is economical to remove valuable substances or because environmental pollution may occur if these substances are permitted to remain in the gas stream.

The techniques commonly used may be wet processes or dry processes, the wet processes including scrubbing of the gas stream with a liquid and the dry processes including adsorption in fixed or mobile beds and various particle separation techniques such as filtration, sedimentation or cyclonic separation and the use of electrostatic precipitators. As noted in the application Ser. No. 488,930, however, it has hitherto been the belief that electrostatic precipitators should not be used except where solids concentrations are very small indeed and hence only after a preliminary separation of particulates has been effected by one or more of the other techniques mentioned.

A special problem arises when the gas stream contains hydrogen fluoride (HF) not only because of the highly corrosive character of this constituent but also because the fluoride is most valuable in the production of aluminum. HF-containing gases are evolved from furnaces for the electrolytic production of aluminum because complex fluorides, such as cryolite, are used as fluxes for the alumina which constitutes the raw material from which the aluminum is produced. The exhaust gases contain up to about 1000 mg HF/m$^3$ (STP), depending upon the method by which the gases are drawn off and the degree to which they are diluted, e.g. by air. As a rule, the gases contain less than 100 mg HF/m$^3$ (STP).

Apart from the techniques described above which have proved to be highly successful in the removal of HF from such gases so as to enable the exhaust gases to be released in a completed nontoxic manner into the atmosphere, various other dry systems have been proposed and are characterized by various drawbacks which should be reviewed in order to place the present improvement in a proper perspective.

For example, in one process dry adsorbents such as limestone, calcium carbonate, slaked lime, quick lime, alumina, activated alumina and magnesia, are introduced into a conduit traversed by the gas stream and leading to a bag filter in which the particles accumulate in a layer which is traversed by the gas. The particles thus remain in contact with the gas for a brief period in the conduit and then are contacted after they form a layer upon the filter surface. The adsorbent is fine-grained and has a mesh size generally smaller than 200 mesh. One difficulty with this system is that segregation of the particles tends to occur and the layer on the vertical pockets of the filter tends to have streaks and regions of different effective thickness so that a homogeneous contact of the gases with the dust cannot be ensured. The contact time between the gas and the particles also tends to be relatively short so that an optimum mass transfer of the HF is not always ensured.

In another process hydrogen fluoride is removed from exhaust gases which contain less than 880 mg HF/m$^3$ (STP) by passing the gas at a temperature below 200° C through a layer of alumina and periodically removing this layer. The fluoride-enriched alumina is introduced into the electrolytic cells. The layer may be formed upon a bag filter and has the disadvantages of the earlier filtration techniques. In both cases as in the systems described in the aforementioned copending applications, any deleterious substances in the gas are either released into the atmosphere or are recycled to the bath with alumina.

In still another system activated alumina is used to treat the gas in counterflow and this system requires large flow cross-sections and is thus economically unviable since it requires the production of activated alumina first.

Other systems are provided and may use filter bags, dense beds (as contrasted with expanded beds) and the like, none of which has proved to be entirely satisfactory for the reasons already stated or on economical grounds.

The impurities mentioned above which have proved to be substantial problems when recycled to a bath for the electrolytic production of aluminum include finely divided carbon, iron, vanadium, phosphorus, titanium and other metals and their compounds which tend to remain as impurities in the aluminum metal when they are present in significant quantities in the bath. In practice, such impurities are found to be recovered with the alumina used to absorb the HF and are returned to the bath therewith.

OBJECTS OF THE INVENTION

It is an object of the invention to provide an improved process for the removal of HF from gases containing same.

It is another object of this invention to provide a process for recycling HF to a furnace for the electrolytic production of aluminum whereby disadvantages arising in earlier processes can be avoided.

Still another object of this invention is to provide an improved process for producing aluminum more economically and with less tendency to contain impurities.

A further object of the invention is to provide an improved system for the removal of HF from a gas stream effluent from a plant for the electrolytic production of aluminum.

It is still another object of the invention to provide a process of the general purpose described above which, however, virtually completely avoids the introduction of impurities into an aluminum bath with the fluoride-laden alumina used for the dry adsorption of HF from the gas.

SUMMARY OF THE INVENTION

It has now been found, most surprisingly, that these objects can all be attained economically and efficiently in a system as described in application Ser. No. 488,930, wherein the gaseous effluent from the electrolytic furnace for the production of aluminum is electrostatically treated to separate solids in an additional electrostatic precipitator which is provided directly ahead of the fluidized bed reactor, i.e., is connected to the fluidizing bed inlet thereof. The impurities are found to be almost completely removed by this preliminary treatment and, most surprisingly, even where some impurities remain, they are found not to be present to any significant concentration in the fluoride-laden alumina which is obtained from the electrostatic precipitator downstream of the expanded fluidized bed.

It has also been found to be advantageous to introduce water into the raw gas prior to subjecting it to the initial electrostatic precipitation, thereby conditioning the gas for the collection of dust. This has been found to result in a still greater separation of the impurities from the gas.

The exhaust gas is then treated in accordance with application Ser. No. 488,930 in that after the preliminary separation of the deleterious impurities the exhaust gases which contain hydrogen fluoride are treated with alumina in a fluidized-bed reactor and the solids discharged with the gases are separated in an immediately succeeding, additional electrostatic precipitator.

In a preferred embodiment of the process, the second electrostatic precipitator which receives the gases after the preliminary separation of most of the deleterious impurities is provided with a plurality of fields and dust bins so that fractions having different particle sizes are separated. The still remaining impurities are then enriched in the finest fraction and separated therewith.

Also in the preferred embodiment of the process, only the coarse fraction, which contains that fraction of fluorine-laden alumina which has the lowest content of the deleterious impurities, is fed directly to the electrolytic furnaces whereas the middle fraction is fed to the fluidized-bed reactor.

That fraction which has been collected in the second electrostatic precipitator and is to be fed to the electrolytic furnaces is suitably heat-treated as proposed in Opened German Specification (Offenlegungsschrift) 21 27 910.

By that treatment, particularly the carbon deposited on the dust fraction is burned in the presence of air at temperatures of about 500° – 1000° C and adsorbed hydrogen fluoride is converted into aluminum fluoride.

The dust which is collected in the first electrostatic precipitator used for preliminary purification is preferably admixed to the fine fraction which is collected in the second electrostatic precipitator and contains the remaining impurities and the resulting mixture is treated in a special rotary kiln with water vapor (pyrohydrolysis) to remove fluorine as proposed in commonly assigned U.S. Patent application Ser. No. 492,871 filed July 29, 1974.

The fluorine which has thus been expelled is fed to the fluidized-bed reactor used to adsorb fluorine. The solids discharged from the pyrohydrolysis furnace after this treatment contain virtually only alumina and the impurities and may be used for special purposes, e.g. in the ceramic industry.

The alumina returned into the electrolytic furnaces contains virtually all fluorine which has been emitted but does not contain impurities which are deleterious for the quality of the metal or the electrolytic process so that this alumina is virtually as pure as the alumina produced by the Bayer process.

Another advantage afforded by the process according to the invention resides in that most the dust-carried fluorine which is contained in the exhaust gases formed by the electrolytic process is separated in the two electrostatic precipitators connected in series. The content of dust-carried fluorine in the pure gas can be minimized by the process according to the invention. In a preferred apparatus for carrying out the process, the subsequent heat-treating and pyrohydrolysis steps can be carried out as a batch operation in one furnace, which consists preferably of a rotary kiln.

BRIEF DESCRIPTION OF THE DRAWING

The process according to the invention is illustrated in more detail in the drawing, the sole FIGURE of which is a flow diagram.

SPECIFIC DESCRIPTION

The raw gas first enters a pipe 1, in which water is added at 2 to condition the gas to a dust resistivity which is suitable for the separation. A major part of the dust impurities is then separated in the electrostatic precipitator 3 and through a discharge device 4 is fed to a pyrohydrolysis furnace 5.

After its prepurification in the electrostatic precipitator 3, the exhaust gas flows in a conduit 6 into a fluidized-bed reactor 7, where it is contacted with alumina adsorbent 8. The fluidized-bed reactor 7 contains a separating baffle 10 for increasing the residence time of the solids.

The gas-solids mixture is conditioned in the fluidized-bed reactor by an addition of water at 9 and then flows in conduit 11 into the second electrostatic precipitator 12. The latter is divided into a plurality of electric fields and is provided with different dust-collecting bins 13, 14, 15. Pure gas leaves the electrostatic precipitator 12 through conduit 16. That fraction which has the lowest impurity content is withdrawn from the bin 13 and is then heat-treated in a rotary kiln 17. After that treatment it has, except for the fluorine content, virtually the same quality as the original $Al_2O_3$ produced by the Bayer process. For this reason this fraction can be fed through the discharge device 18 to the electrolytic bath without adversely affecting the electrolytic process.

The impurities which remain in the gas after the preliminary separation in the electrostatic precipitator 3 are enriched in the dust-collecting bin 15 and in the preferred embodiment of the process are also separately discharged and are further treated in the pyrohydrolysis furnace 5 together with the material discharged at 4.

The main quantity of the dust which has been collected in the electrostatic precipitator 12 is discharged over the dust-collecting bins 14 and is returned into the fluidized-bed reactor 7.

As mentioned before, the dust which carries the impurities is treated in the pyrohydrolysis furnace 5 at elevated temperatures with water, preferably in the form of steam 20, and the expelled gases, which contain mainly HF, are fed to the fluidized-bed reactor 7 in a conduit 21 together with the exhaust gases coming from the heat-treating furnace 17 in conduit 19.

The solids 22 discharged from the pyrohydrolysis furnace 5 contain mainly $Al_2O_3$, in addition to the impurities, and are used for special purposes, e.g. in the ceramics industry.

SPECIFIC EXAMPLE

Using a fluidized-bed reactor and an electrostatic precipitator comprising two fields and four dust bins of the type generally shown in the drawing and having the particular configuration of the system of FIG. 2 of Ser. No. 488,930, alumina which had an ignition loss of 1% by weight and produced by calcination if a fluidized bed is used as the adsorbent. The solids had a surface area (BET) of about 25 square meters per gram and a mean particle diameter of 40 microns. The exhaust gas contained 35 milligrams of hydrogen fluoride per standard cubic meter and also has a temperature of 80° C. The exhaust gas also contained 200 milligrams of dust per standard cubic meter. The composition of the dust was:

20% by weight F (solid F)
16% by weight C
1.5% by weight $Fe_2O_3$
0.2% by weight $V_2O_5$
0.1% by weight $P_2O_5$
remainder — $Al_2O_3$.

The gas was fed to the fluidized-bed reactor 7 at a rate of 5800 standard cubic meters per hour and the alumina was charged into the fluidized bed at a rate of 14 kilograms per hour by the feeder 8. The gas velocity in the fluidized-bed reactor corresponded to a velocity of 3.3 meters per second in the empty reactor.

Water at a rate of 20 liters per hour was supplied at 2 to a venturi humidifier 1 to condition the solid-gas suspension for the separation in the electrostatic precipitator 3. Approximately 80 – 90% of the iron, vanadium and phosphorus oxides were removed in the electrostatic precipitator 3 and recovered from its bin 4.

Water at the rate of 40 liters per hour was fed through conduit 9 to condition the solid-gas suspension in the fluidized bed and reduce the temperature of the suspension to 60° C at the outlet 3 to electrostatic precipitator 12. The solid-gas suspension withdrawn at 11 had a content of 175 grams of solids per standard cubic meter.

The solids were subjected to fractionating separation in the electrostatic precipitator.

The amount of solids separated in the four dust bins was 1000 kilograms per hour, the fines recovered 15 being supplied to pyrohydrolysis kiln 5. The major part of the solids (about 985 kg/hr) was returned at 14 from the two central dust bins (represented as the four bins 14 in the FIGURE) to the fluidized-bed reactor 7. The fine fraction was collected at a rate of 0.5 kilograms per hour and delivered to the pyrohydrolysis kiln 5 and was found to contain practically all of the iron, vanadium and phosphorus oxide apart from those oxides recovered at the electrostatic precipitator 3. The coarse fraction was heated in the kiln 17 to decarbonize it and the resulting alumina (about 13.5 kg/hr) was supplied to the aluminum furnace.

The exhaust gases leaving the system contained less than 30 milligrams of dust per standard cubic meter and less than 0.8 milligrams of hydrogen fluoride per standard meter. The alumina collected at 13 and delivered at 18 to the electrolytic bath contained substantially no iron, vanadium and phosphorus oxide. Substantially all of the iron, vanadium and phosphorus oxides were found to be collected in the solids supplied to the pyrohydrolysis kiln 5.

The solids supplied to the kiln at 5 were heated in an air stream in amount of 0.3 standard cubic meters per hour for each 50 grams of solids in the presence of water vapor whereupon the oxides were defluorinated with the gas being fed at 21 to the fluidized bed. The reaction temperature was 900° C. The solids, containing all of the iron, vanadium and phosphorus oxide, were recovered for use in the ceramics industry as described in application Ser. No. 492,871.

I claim:
1. A method of removing hydrogen fluoride from an exhaust gas produced by a plant for the electrolytic production of aluminum, said gas containing impurities detrimental to the aluminue, said method comprises the steps of:
   a. electrostatically precipitating said impurities from said gas;
   b. thereafter passing said gas from which the impurities have been electrostatically precipitated in step (a) through an expanded fluorized bed of alumina particles to adsorb hydrogen fluoride from said gas on said alumina particles;
   c. entraining the alumina particles on which hydrogen fluoride is adsorbed from said gas from the top of said expanded bed in a gas-solid suspension;
   d. separating solids from said suspension by electrostatically precipitation immediately upon passage of said suspension from said bed, thereby grading said solid into a coarse-grain fraction, a medium-grain fraction and a fine-grain fraction, said fractions being separately collected;
   e. heating said coarse-grain fraction and thereafter feeding the heated coarse-grain fraction to a furnace for the electrolytic production of aluminum; and
   f. subjecting said fine-grain fraction to pyrohydrolysis to evolve hydrogen fluoride therefrom.

2. The method defined in claim 1, further comprising the steps of moisturizing the gas prior to electrostatic precipitation in step (a).

3. The method defined in claim 1, further comprising the step of feeding said medium-grain fraction to said fluidized bed.

4. The method defined in claim 1 wherein the hydrogen fluoride produced in step (f) is fed to said fluoridized bed.

5. The method defined in claim 1 wherein hydrogen fluoride is evolved upon heating of said coarse-grain fraction in step (4) and is fed to said fluoridized bed.

6. The method defined in claim 1, further comprising the step of subjecting solids collected in step (a) by electrostatic precipitation to pyrohydrolysis.

7. The method defined in claim 6 wherein hydrogen fluoride is produced by pyrohydrolysis of the solids collected in step (a) and is fed to said expanded bed.

8. An apparatus for the removal of hydrogen fluoride from exhaust gas formed in the electrolytic production of aluminum in an electrolytic furnace, said gas containing impurities detrimental to the aluminum, said apparatus comprising:
   a. a first electrostatic precipitation connected to said furnace and traverse by said exhaust gas for electrostatically precipitating said impurities from said gas;
   b. means forming an expanded fluoridized bed of alumina particles connected to said first electrostatic precipitation for adsorbing hydrogen fluoride from said gas on said alumina particles;
   c. means for entraining alumina particles in a gas stream from the top of said fluorized bed in a gas-solid suspension;
   d. a second electrostatic precipitation connected with said fluorized bed and receiving said suspension therefrom for separating solids from said suspension immediately upon passage of said suspension from said bed and grading the separated solids into separately collected fractions including a coarse-grain fraction, a medium-grain fraction and a fine-grain fraction;
   e. means for heating said course-grain fraction and thereafter feeding the heated coarse-grain fraction to a furnace for the electrolytic production of aluminum; and
   f. means for subjecting said fine-grain fraction to pyrohydrolysis to evolve hydrogen fluoride therefrom.

* * * * *